United States Patent
Merryweather

[15] 3,703,992
[45] Nov. 28, 1972

[54] SPRINKLER HEAD PROTECTOR

[72] Inventor: Lloyd Merryweather, 7160 N.E. 8th Drive, Boca Raton, Fla. 33432

[22] Filed: March 17, 1971

[21] Appl. No.: 125,150

[52] U.S. Cl. .............................................. 239/201
[51] Int. Cl. ............................................ A01g 25/06
[58] Field of Search ............................ 239/201, 200

[56] References Cited

UNITED STATES PATENTS

| | | | |
|---|---|---|---|
| 3,015,448 | 1/1962 | Hurless | 239/201 |
| 3,018,057 | 1/1962 | Anderson | 239/201 |
| 3,265,310 | 8/1966 | Cohen | 239/201 |

Primary Examiner—M. Henson Wood, Jr.
Assistant Examiner—Thomas C. Culp, Jr.
Attorney—A. Yates Dowell and A. Yates Dowell, Jr.

[57] ABSTRACT

A ground inserted multi-layer shield for providing a protective barrier around a fluid broadcasting head wherein the shield is adjustable to various thicknesses and may be made from lightweight material. The shield is constructed of a plurality of members stacked one upon another to achieve a desired overall stack height or thickness.

4 Claims, 4 Drawing Figures

PATENTED NOV 28 1972

3,703,992

INVENTOR
LLOYD MERRYWEATHER

BY
ATTORNEYS

SPRINKLER HEAD PROTECTOR

BACKGROUND OF THE INVENTION

1. Field of the Invention

This application relates generally to fluid sprinklers wherein underground supply conduits convey fluid to a sprinkler head which is protected by a ground inserted shield or protector.

2. Description of the Prior Art

Ground inserted shields have been provided which form a barrier around sprinkler heads to protect them from damage arising from rolling heavy devices over them, cutting them with lawn mower blades, or striking them with sharp objects. These shields have been placed on an unstable soil base and as the underlying soil has settled they have sunk into the ground and exposed the sprinkler heads to damage. Such settling has resulted partly from the erosive action of runoff water and has been encouraged by the relatively heavy weight of the sprinkler protector itself which as pushed down upon and displaced the underlying soil. When such sprinkler protectors have sunk into the ground, it has been necessary to remove them from the ground and to rebuild the soil base in order to raise them to a proper level.

One method for keeping protectors from sinking into the ground is to rest them directly upon an underground conduit. Such conduits are located at varying depths in the soil. Therefore, while a protector of non-adjustable vertical thickness may be large enough in one situation to rest upon an underground pipe and extend upwardly to partially envelop a sprinkler head, it may be too long or too short where an underground pipe is located at a different depth in the soil. In the past protectors have been made as one-piece non-adjustable structures and have not been readily adapted to use in such varying circumstances.

SUMMARY OF THE INVENTION

The present invention is a shield or protector for a sprinkler head which overcomes the problems of prior art devices. The shield may be constructed of lightweight materials thereby minimizing the tendency of the shield to push downwardly into the underlying soil. In addition, the shield or protector is made from a plurality of separate members which may be stacked one upon another to build up a protector which has a height or thickness best suited to the requirements of the particular circumstances where the protector is located.

DESCRIPTION OF THE PREFERRED EMBODIMENT

Figure 1:
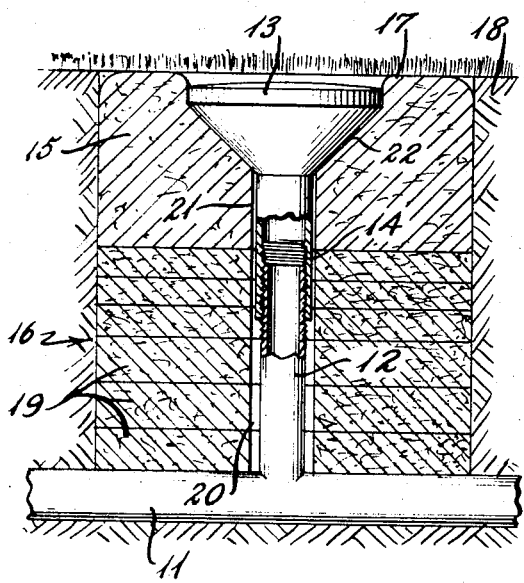
FIG. 1 is a vertical section of a sprinkler head and protector wherein the protector rests directly upon an underground supply conduit.

An ordinary sprinkler illustrated in FIG. 1 serves to water adjacent grass, flowers, or other desired objects. Water runs through a horizontal underground supply conduit 11 through a branching vertical feed pipe 12 to the sprinkler head 13 which is mounted adjacent the ground surface level on the upper end of the vertical feed pipe. The sprinkler head may be removed from the end of the feed pipe and accordingly may be provided with a sleeve 14 which is threaded over the upper end of the feed pipe to facilitate such removal, as well as limited vertical adjustment. Other sprinkler head mountings may serve in place of the threaded connection.

In order to insure against damage to the sprinkler head, a protector in accordance with the present invention, which has adjustable thickness and which does not readily sink down into the soil, is provided. It is installed in a hole in the ground around the feed pipe and sprinkler head and includes top member 15 and base portion 16. The protector may be installed at the time when the sprinkler system piping is placed in the ground or may be added to a sprinkler system already in use.

The base portion 16 serves to support the top member 15 so that the upper surface 17 of the top member is level with or at an appropriate position above or below the adjacent ground surface level. The base portion should have a minimal tendency to sink down into the ground in order to prevent downward displacement of the top member and exposure of the sprinkler head to damage. Therefore, during installation of the protector where the underground conduit 11 is not far below the ground surface, as illustrated in FIG. 1, soil is removed all the way down to the underground conduit 11 and the base portion 16 is caused to rest directly upon the solid base provided by the underground conduit. In this situation, the top member 15 and the base portion 16 can be constructed of any desired material such as rubber, cement, or a polymer or copolymer material such as polyurethane, polyethylene or the like. This type of installation is generally used when adding protectors to an existing sprinkler system where the underground conduit is less than, for example, one foot below the ground surface, and it is also used when placing new sprinkler system piping.

Figure 2:
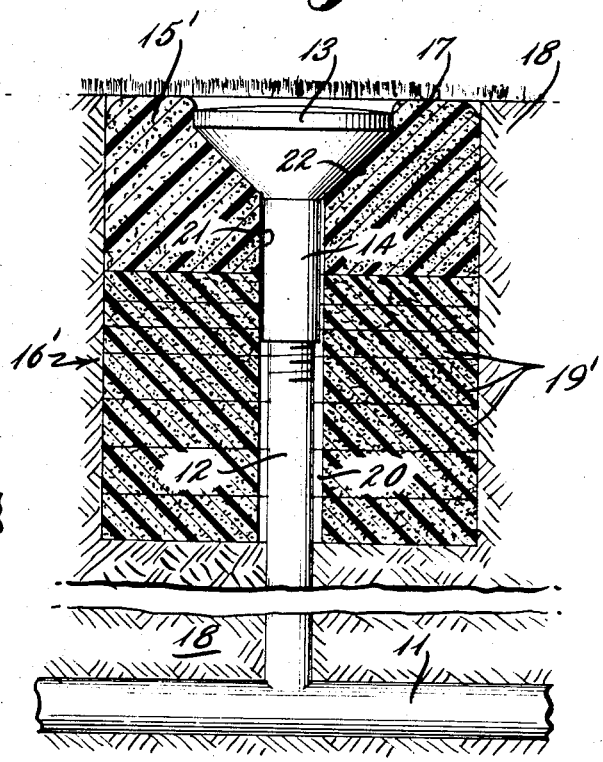
FIG. 2 is a vertical section of a sprinkler head and modified form of protector wherein the protector rests upon an unstable soil base.

However, often the underground conduit will be less accessible, as for example, in an existing sprinkler system wherein the underground conduit is located at a depth over one foot below the ground surface level, as illustrated in FIG. 2. Installation of the protector in this situation involves removing soil surrounding the feed pipe 12 to a desirable depth at which the soil base is not readily washed out by runoff water, and then placing a base portion 16' so that it rests directly upon a soil base, as indicated at 18, and placing a top member 15' on such base portion.

In cases where the top member 15' and the base portion 16' of the protector must rest upon an unstable soil base 18, a lightweight foam material such as polyurethane, styrofoam and the like, having a density which is less than the density of the underlying soil base, can be used since such material is less likely to bear down heavily upon and sink into the soil base. This characteristic of light weight is enhanced by use of foam material which is not likely to absorb water, such as closed cell foam.

It has been found that under certain conditions the base portion 16 or 16', and top member 15 or 15', should be made from different materials. For example, where the sprinkler head may be subject to being struck by various objects, the top member may be made from hard rubber, plastic, cement or similar materials less likely to be damaged, while a lightweight foam base portion may be used to minimize the total weight of the protector.

In the installation of the protector device, it has been found that the depth of the hole in the ground surrounding a feed pipe 12 which will receive the base portion 16 and 16' may vary greatly. If the base portion is to rest on an underground conduit 11, as in FIG. 1, the underground conduit will be found to be located at various depths below ground. If the base portion is to rest on soil 18, as in FIG. 2, difficulty may be encountered in forming a hole of exactly the proper depth, or differing tendencies of the soil to erode may require different depth holes. Accordingly, the base portion 16 and 16' may be constructed to the thickness required by such variable depth holes.

Figure 3:
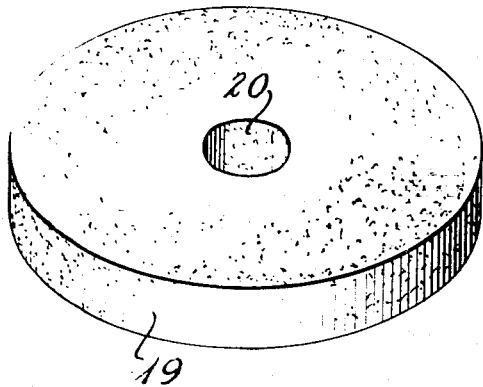
FIG. 3 is a perspective of a disk-like member for the base portion of the protector.
Figure 4:
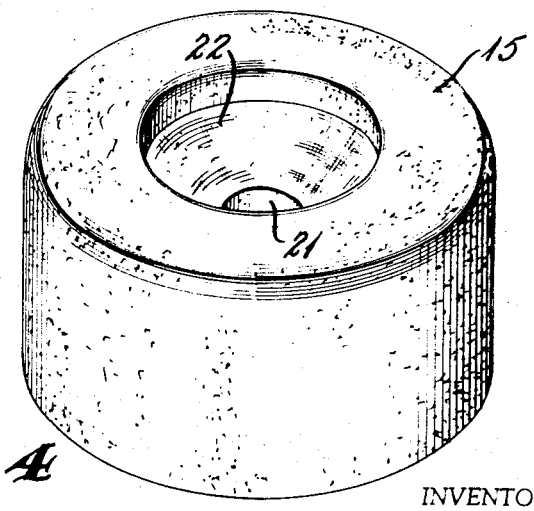
FIG. 4 is a perspective of a top member of the protector.

To accomplish such construction, the base portion 16 or 16' includes a plurality of disk-like members or filler pads 19 or 19' each having an opening 20 therethrough for reception of the feed pipe 12, as illustrated in FIG. 3. The filler pads may be provided in several thicknesses, as for example, 2 inch, 1 inch, and ½ inch so that a desirable combination of these pads may be fitted over and along the vertical feed pipe to provide a proper positioning for the top member 15 or 15' relative to the adjacent ground surface level. As illustrated in FIG. 4, the top member 15 or 15' is of generally cylindrical shape and has a bore 21 connnected to a tapered counterbore 22 and adapted to receive the upper end of the feed pipe 12 and the sprinkler head 13.

In the operation of the device, a hole or pit of an appropriate size is dug and the base portion and top member are fitted over the feed pipe 12, after which the sprinkler head 13 is threaded onto the feed pipe and positioned within the counterbore 22 so that the uppermost portion of the sprinkler head will lie in desired spaced relation with respect to the horizontal top surface 17 of the top member 15 or 15'. Ordinarily the sprinkler head will be positioned at or below the horizontal plane of the top surface 17. In some cases the protector may tend to float or rise out of the surrounding soil, as for example when it is constructed from a low density closed cell foam material. Therefore, it may be desirable to cause a portion of the sprinkler head 13 to bear against the counterbore 22 and retain the top member 15 or 15' against upward movement.

After installation of a sprinkler head protector, grass and soil may begin to build up around the sprinkler head and top member 15 or 15'. When this buildup interferes with spray distribution, the sprinkler head may be unthreaded from the feed pipe 12, the top member 15 or 15' removed, and the thickness of the base portion 16 or 16' increased by placing additional disk-like members or filler pads 19 or 19' as needed over the feed pipe. This will raise the top member to the desired level with respect to the surrounding ground surface. There is thus no need to remove the entire base portion from the ground in order to build up the soil on which the base portion rests. The limits on this vertical readjustment are dependent upon the vertical adjustability of the sprinkler head itself on the feed pipe.

I claim:

1. In a lawn sprinkling system having a fluid supply conduit, at least one feed pipe communicating with said conduit, a sprinkler head adjustably mounted on said feed pipe, and a sprinkler head protector disposed about said sprinkler head, the improvement comprising a non-absorbent base located beneath said protector, said base having an opening to receive said feed pipe, said base having an upper surface for engaging the bottom surface of said protector and extending downwardly into the earth a substantial distance therebelow for supporting said protector in proximity to said sprinkler head and resisting soil erosion below said protector and thereby maintaining said protector in proximity to said sprinkler head.

2. The structure of claim 1, in which said base is constructed of a material having a density less than the density of the earth.

3. The structure of claim 1, in which said base includes a plurality of disk-like members arranged in stacked relationship.

4. The structure of claim 3, in which said plurality of disk-like members have different thicknesses.

* * * * *